UNITED STATES PATENT OFFICE.

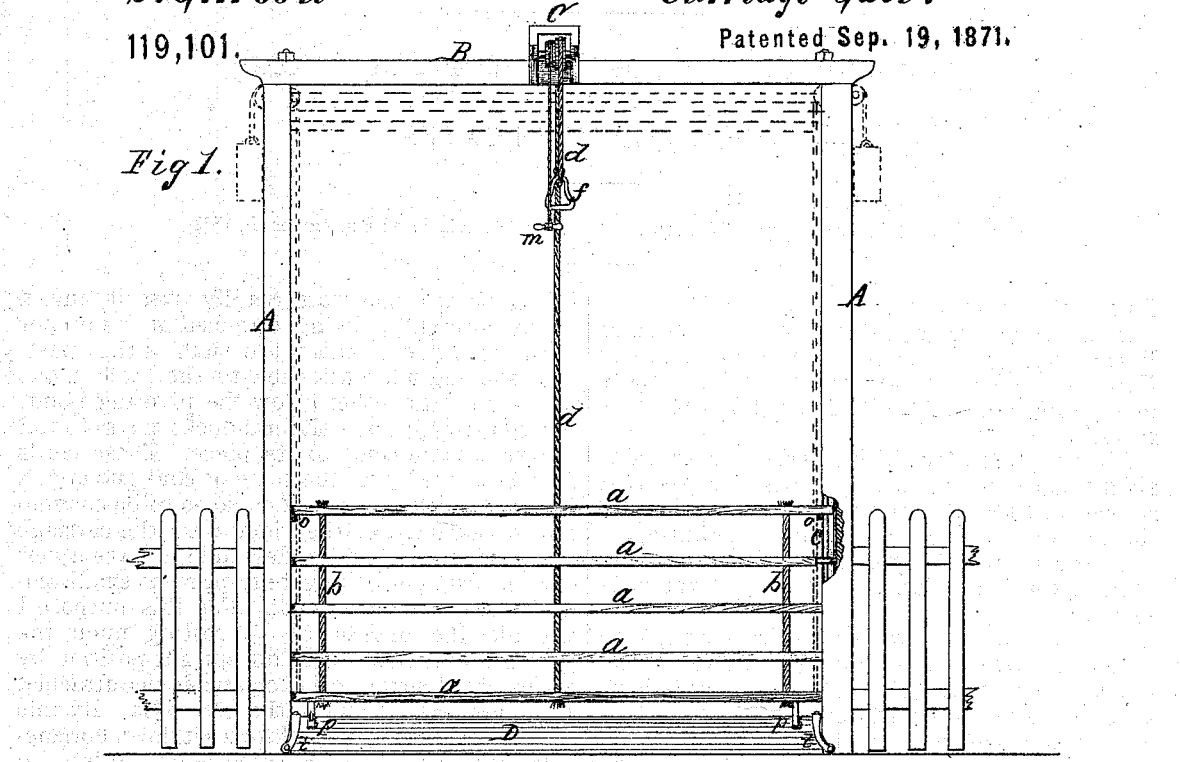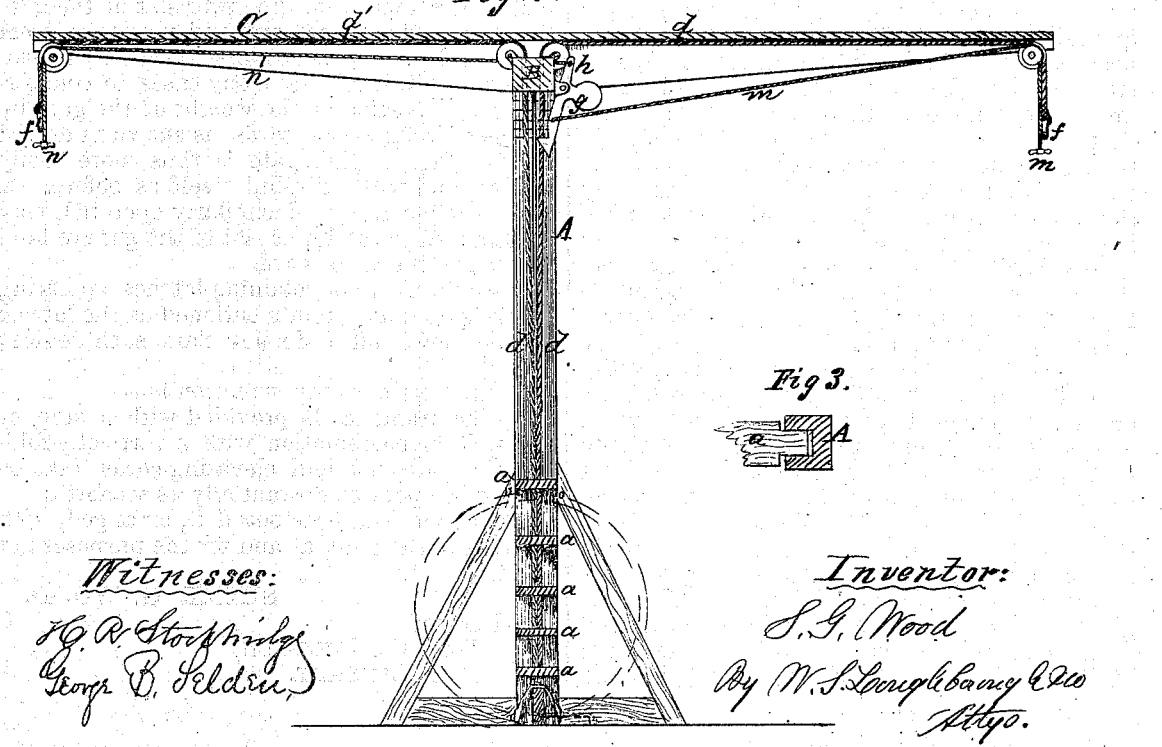

SEYMOUR G. WOOD, OF ROCHESTER, NEW YORK.

IMPROVEMENT IN GATES.

Specification forming part of Letters Patent No. 119,101, dated September 19, 1871.

*To all whom it may concern:*

Be it known that I, SEYMOUR G. WOOD, of Rochester, in the county of Monroe and State of New York, have invented certain Improvements in Carriage-Gates, of which the following is a specification:

My invention consists of a series of horizontal slats connected together by cords or ropes, and so operated that the gate may be elevated out of the way of the carriage without dismounting.

In the drawing, Figure 1 is a front elevation of my invention. Fig. 2 is a vertical transverse section.

The slats or bars $a$ of the gate are secured to each other by cords $b$ or other flexible connections, so that each bar shall maintain its horizontal position when the cords are taut. The ends of the slats may be fitted to move vertically in grooves formed upon the inner face of the posts A, as shown in Fig. 3, or made to embrace a rod, $c$, passing from the top of the posts to the ground, as shown in Fig. 1. When in its lower position the upper slat of the gate rests upon a stop, O, secured to the posts A, and the slats are so proportioned, either in length or width, that all but the upper one shall pass the stop in their descent. For the purpose of elevating the gate I provide the cords $d\ d'$, passing loosely through the upper slats and made fast to the lower one. These cords extend upward to the cross-girt B and over rollers thereon, and from thence over other rollers at the extremities of the boom C, terminating in handles $f f'$. The boom C is attached, at right angles or nearly so, to the cross-girt B at or near its center, and extends far enough each way from the gate to allow the operator in a carriage to grasp the handles $f f'$ when a horse is driven up. It will be observed that a pull upon either handle $f f'$ or cord $d\ d'$ elevates the gate, beginning at the lower slat, and a continued pull upon them folds the slats together at the upper portion of the frame A B, as shown in dotted lines in Fig. 1. To retain the gate in its elevated position the latch $h$ is pivoted to the girt B and extends downward far enough to hook under the lowest slat, as indicated by dotted lines in Fig. 2. The side of this latch being beveled off, as shown, the slats readily pass it, and, a counter-weight, $g$, being attached at the proper point, it is forced under the slats as they pass. Cords $m$ and $n$ are attached to the latch $p$, one above and the other below the pivoting point, whereby a pull upon either unlocks the gate and allows it to descend to its place. These cords may be passed over the same or contiguous pulleys to the lifting-cords $d\ d'$, so as to be convenient to the hand of the rider after the carriage has passed. It is often desirable to have a vertical board below the gate to prevent small animals from working under. For this purpose I provide the base-board D, resting upon the ground, and retained in its upright position by strips of rubber $t$ or other elastic device attached to its upper edge and to the gate-post. By this means the carriage-wheel forces it down horizontally as it passes, as indicated in dotted lines in Fig. 2, after which it returns to its place. Jaws $p$ may be attached to the lower slat of the gate to embrace the base-board and prevent it from being pushed over except when the gate is raised. It may be desirable in many cases to counterbalance a portion of the weight of the gate by means of weights and cords, as shown in dotted lines in Fig. 1. The gate is thus more easily opened, and will still shut itself as before. A latch similar to $h$, and similarly operated, may be attached to the lower slat of the gate to hold it down to the base-board.

I am aware that retaining-latches operating similarly to that herein mentioned as the latch $h$ are not new, and I do not claim such device; but

What I claim as my invention is—

1. The frame A B provided with a stop or stops, O, in combination with a vertically-folding slat-gate, $a\ b$, and elevating-cords $d\ d'$, arranged to operate substantially as set forth.

2. The yielding base-board D, arranged, with relation to the gate, as and for the purposes set forth.

SEYMR. G. WOOD.

Witnesses:
DANL. L. JOHNSTON,
F. H. CLEMENT.